Sept. 19, 1939.  R. L. HASCHE  2,173,111
PROCESS FOR DEHYDROGENATING ALCOHOLS
Filed Aug. 1, 1935  9 Sheets-Sheet 5

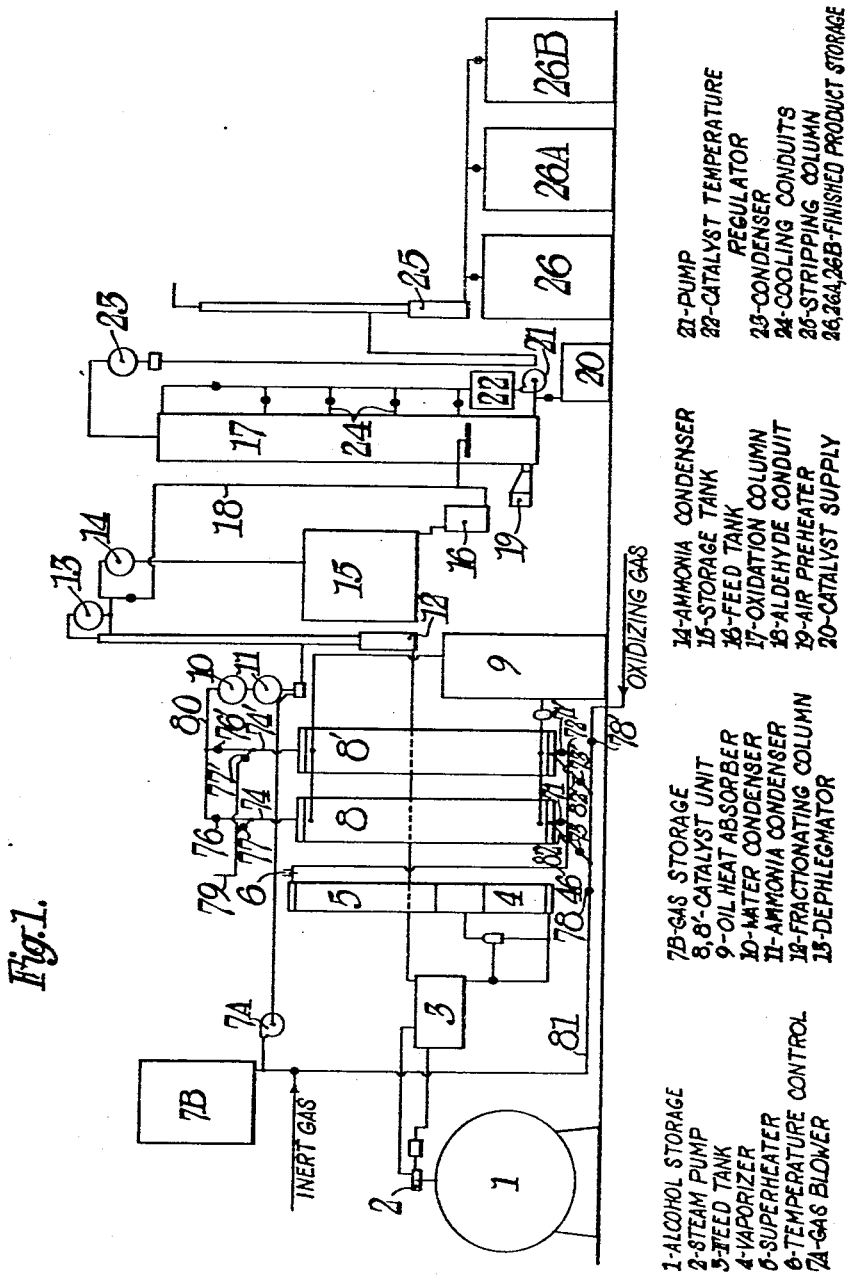

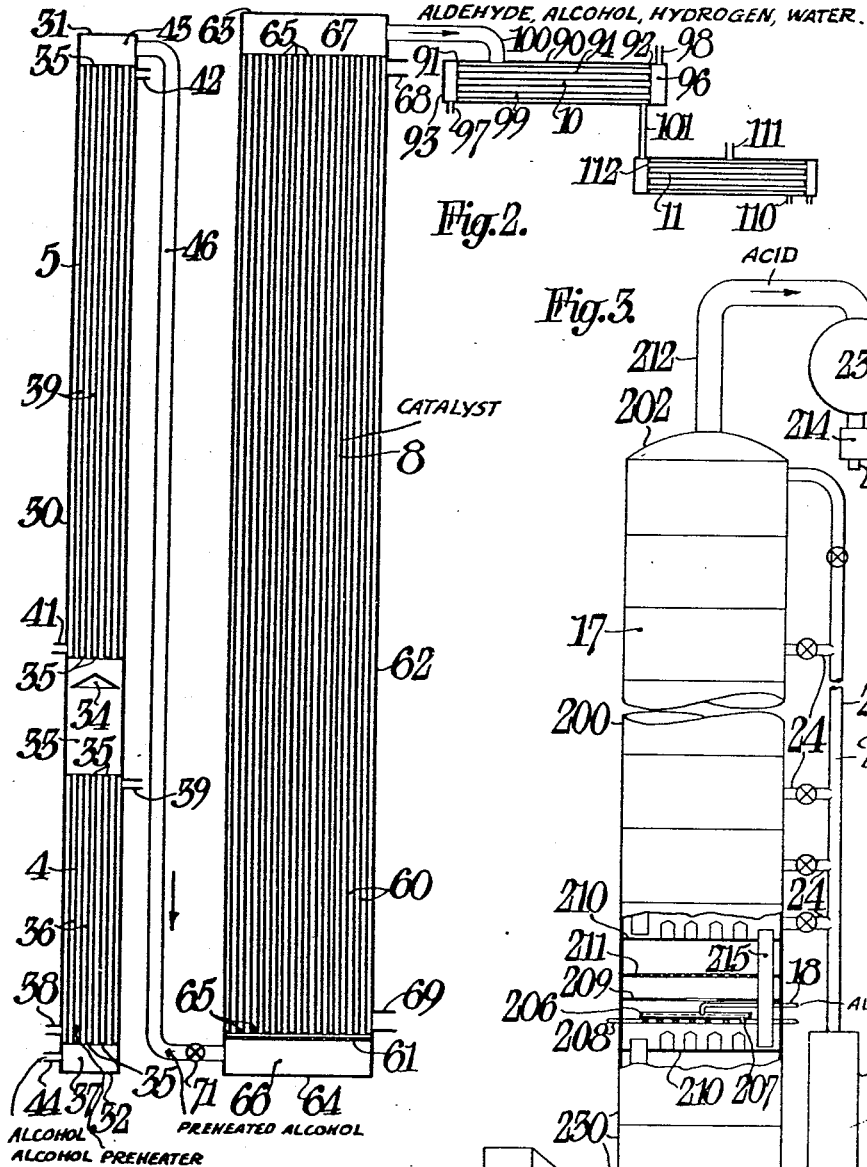

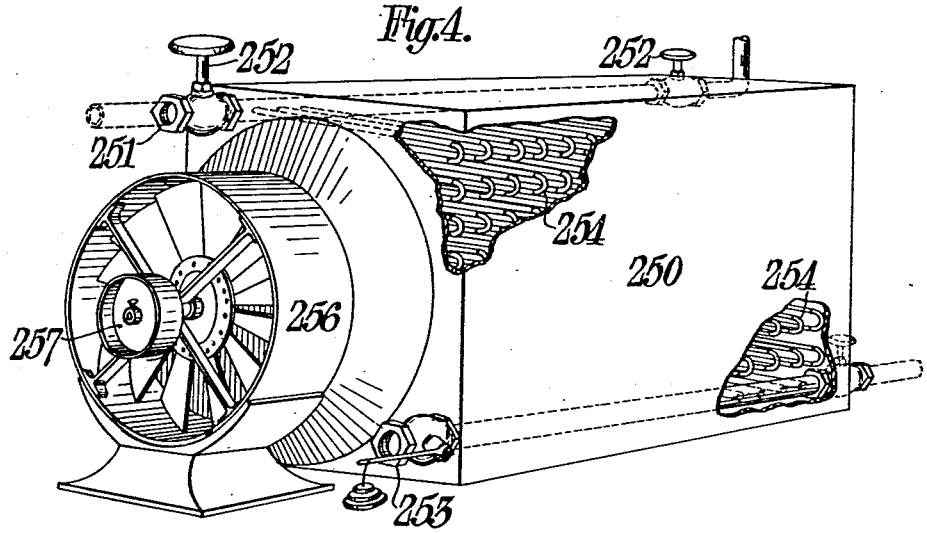
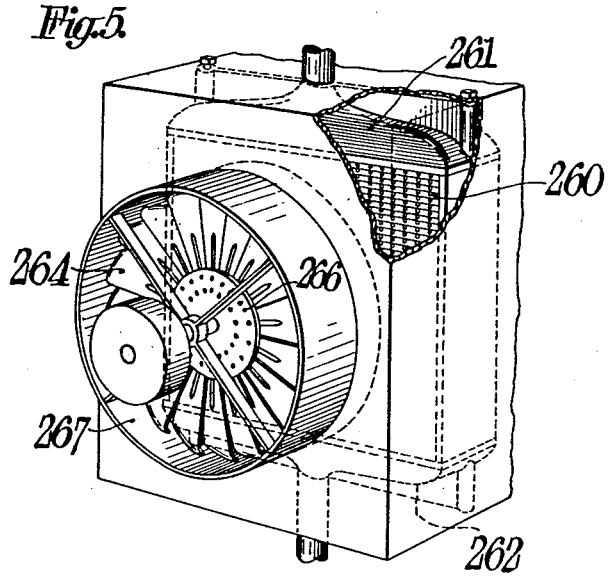

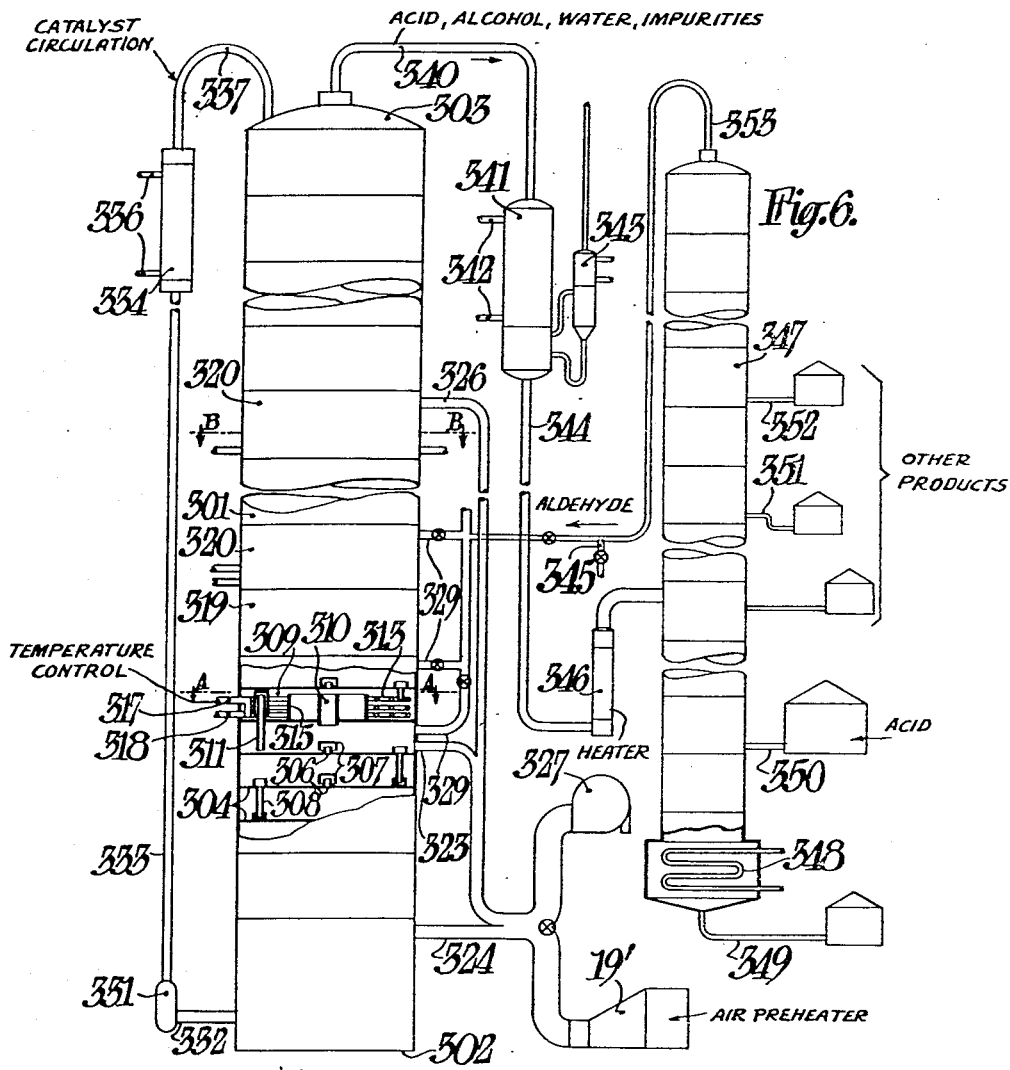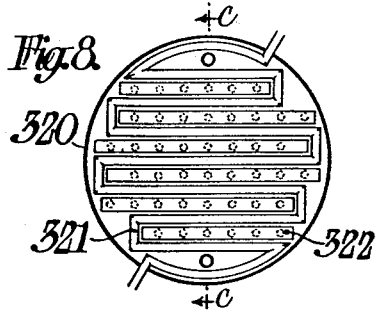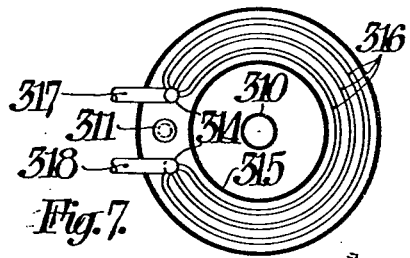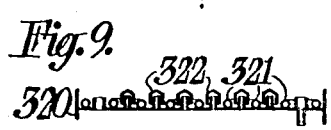

INVENTOR:
Rudolph Leonard Hasche,
BY N. M. Perrins
Daniel J. Mayne
ATTORNEYS.

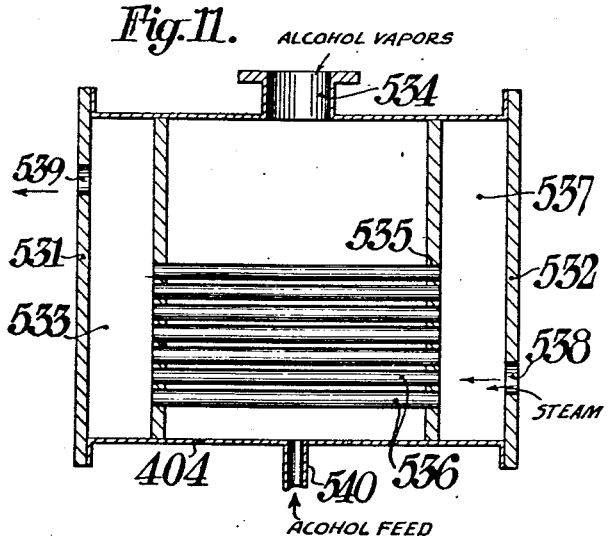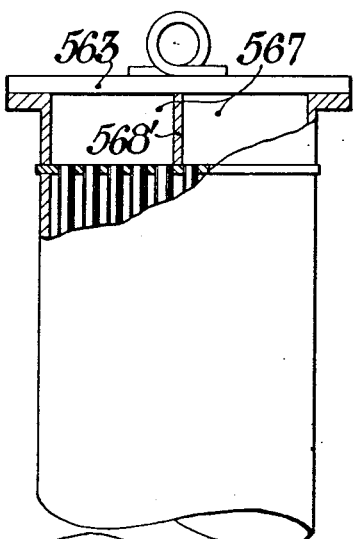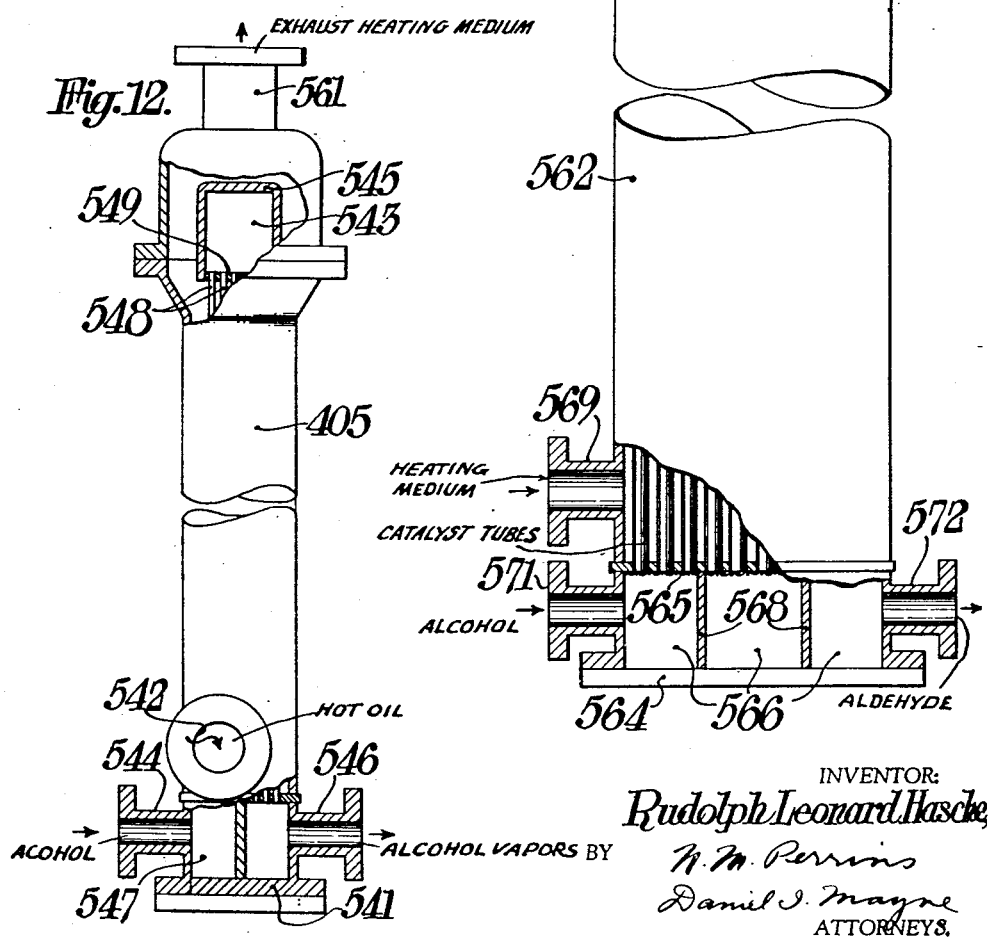

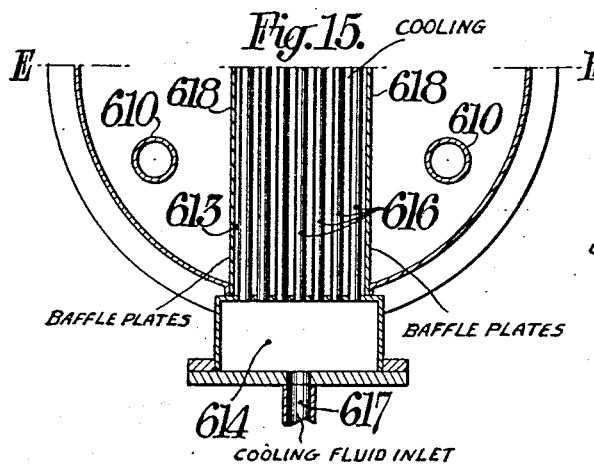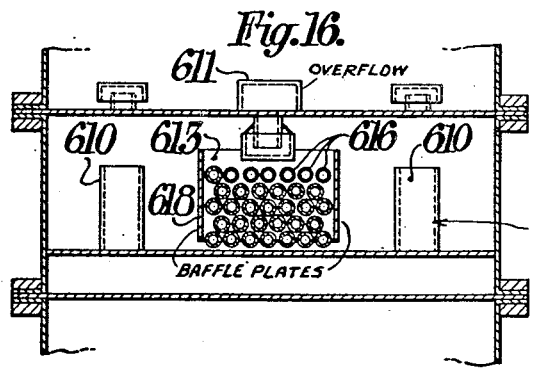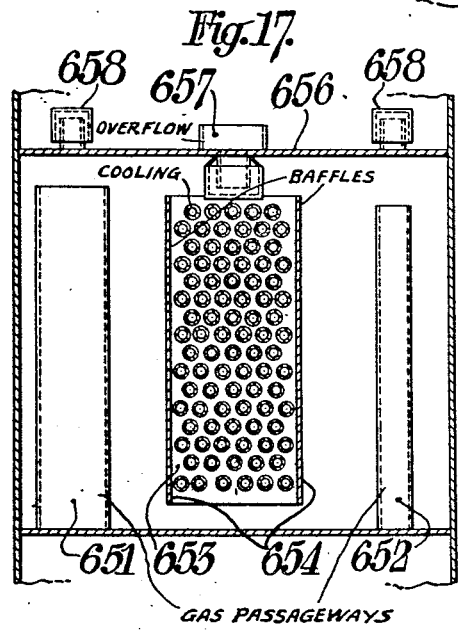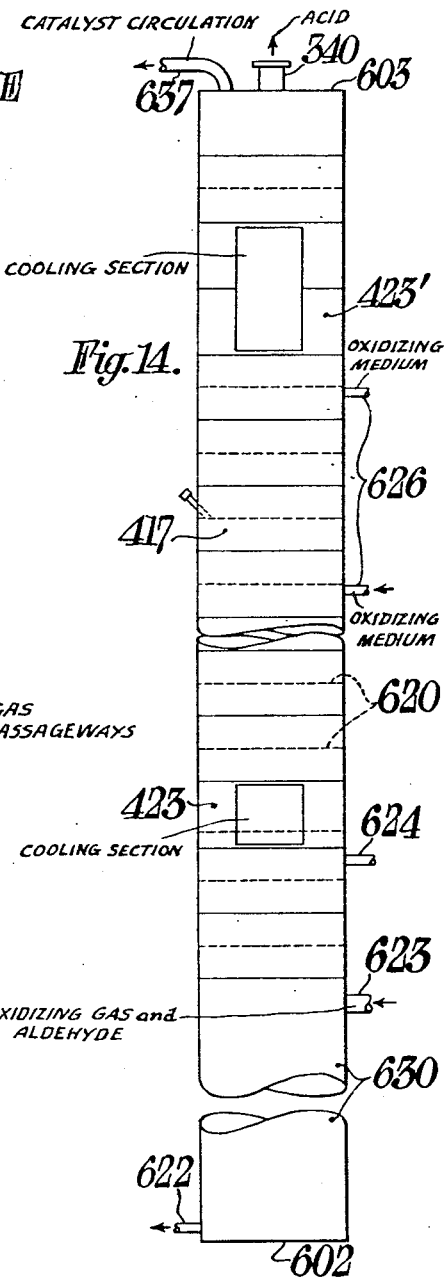

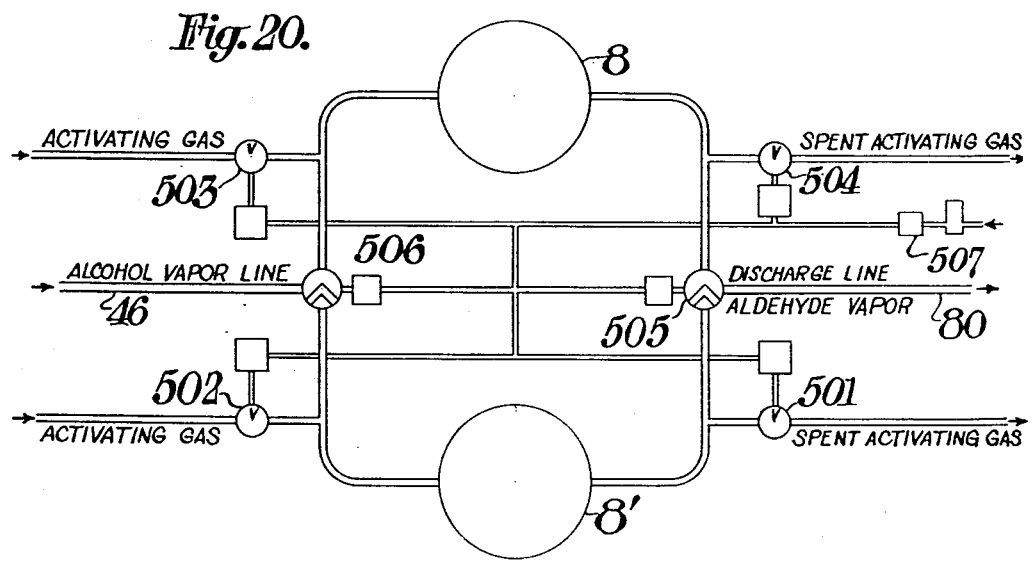

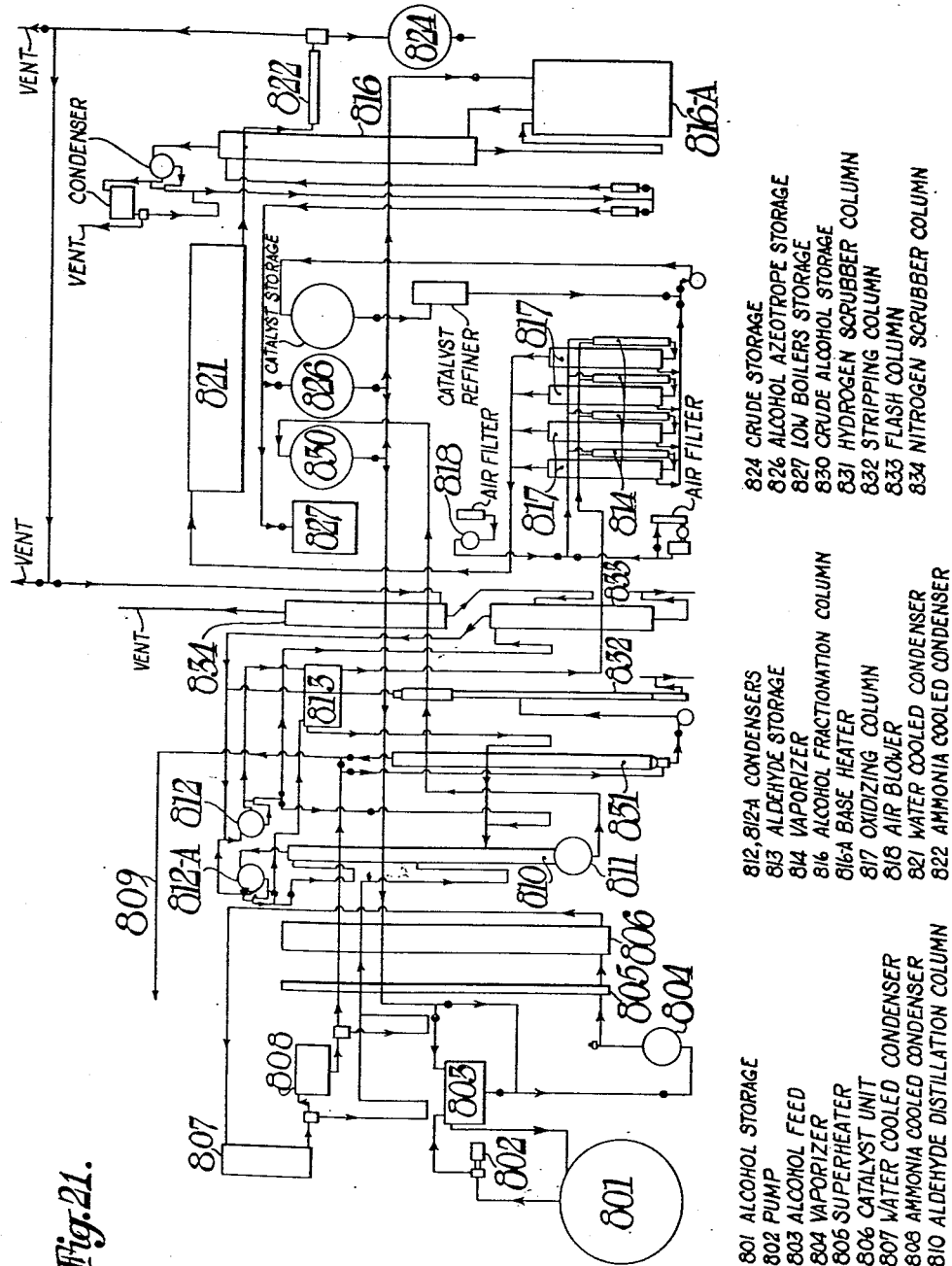

Patented Sept. 19, 1939

2,173,111

UNITED STATES PATENT OFFICE 2,173,111

PROCESS FOR DEHYDROGENATING ALCOHOLS

Rudolph Leonard Hasche, Kingsport, Tenn., assignor, by mesne assignments, to Eastman Kodak Company, Jersey City, N. J., a corporation of New Jersey Application August 1, 1935, Serial No. 34,215

17 Claims. (Cl. 260—603)

This invention relates to processes for dehydrogenating alcohols, and more particularly to a process for converting n-propyl alcohol into propionaldehyde and propionic acid.

The production of dehydrogenation products of alcohols is of great technical importance. Examples of some of the products produced from alcohols are propionic aldehyde, a compound with a formula $CH_3CH_2CHO$ and propionic acid, sometimes called methyl acetic acid, a compound with the formula $CH_3CH_2CO_2H$. Some other compounds which may be produced from alcohols are of the butyl series. N-butyric aldehyde is a compound having the formula $CH_3CH_2CH_2CHO$. N-butyric acid, sometimes referred to as ethyl acetic acid, or butane acid, has the empirical formula $C_4H_8O_2$. There are also other compounds, such as valeric acid, isovaleric acid and the corresponding aldehydes.

These compounds are used in a number of ways industrially, such as, for example, propionic and butyric acids may be employed in making cellulose acetate propionate and cellulose acetate butyrate in the manner described in Clarke and Malm Patent No. 1,800,860, or the acids might be employed in preparing acid chlorides, or various acid salts for use as mordants in dyeing processes.

To produce these higher aldehydes and acids in an efficient commercial manner is a highly desirable result. Propionic acid is now obtained in small quantities from treating pyroligneous liquor. Butyric acid may be obtained from fermentation processes.

There are a number of processes disclosed in the art which broadly describe catalytically converting alcohols to aldehydes and thereafter oxidizing the aldehydes to acids, particularly with reference to the treatment of ethyl alcohol.

I have developed a new continuous process for converting 3-4 carbon atom alcohols to aldehydes and acids together with new apparatus, catalysts and related means for accomplishing the following objects.

This invention has as an object to provide a process of dehydrogenating 3-4 carbon atom alcohols, or materials containing a large amount of 3-4 carbon atom alcohols. Another object is to provide a continuous process for converting the alcohols into their corresponding aldehydes. A further object is to provide a process particularly adapted for the treatment of propyl alcohol.

Another object is to provide a new oxidation catalyst particularly suitable for treating the aldehydes produced from 3-4 carbon atom alcohols. A still further object is to provide a new process of regenerating or activating the dehydrogenation catalyst.

A further object is to provide a continuous process for producing acid in which dehydrogenation and oxidation are the main factors. Another object is to provide a process for treating pure alcohols or alcohols containing small amounts of other constituents. Still another object is to provide a plurality of plant layouts of apparatus for dehydrogenation and oxidation. Another object is to provide a process particularly suitable for the production of propionic aldehyde from n-propyl alcohol.

Other objects will appear hereinafter.

I have found that highly desirable results may be obtained by catalytically treating the higher alcohols to dehydrogenate them, and coupling this step with a step wherein the hydrogen may be separated and employed for regenerating the catalyst or as a substitute for hydrogen, the alcohol of the process may be employed. Thereafter the aldehyde resulting from the dehydrogenation may be separated and employed for any of the usual uses of aldehyde.

In the preferred embodiment of my process, n-propyl alcohol is treated as described to obtain a high yield of propionaldehyde. This aldehyde may be oxidized to propionic acid with a high yield of acid. It is, therefore, apparent that when the proper catalyst combinations are employed my process has a very high overall efficiency.

N-propyl alcohol, sometimes described as 1-propyl alcohol or propanol, in the pure condition is a substantially colorless liquid having a formula $CH_3CH_2CH_2OH$, a density of .799 and a boiling point of about 97° C. While I prefer to employ a pure alcohol, other materials, which do not detrimentally effect the products produced, may, of course, be present.

For further details concerning my new process, and for a more complete understanding of my invention, reference is made to the accompanying drawings forming a part of the present application.

In the accompanying drawings, in which like reference characters refer to like parts, Fig. 1 is a diagrammatic side elevation of one plant layout of apparatus for practicing my new process.

Fig. 2 is a semi-diagrammatic side elevation of one type of suitable catalyst unit and associated parts represented in Fig. 1 at 8, 8', 10, and 11, certain parts being shown in an exaggerated scale, other parts being shown on section for clarity.

Fig. 3 is the same type of view as Fig. 2 of another piece of apparatus represented in Fig. 1, namely, the oxidation tower 17, and associated parts.

Figs. 4 and 5 are detailed views in the perspective on a larger scale showing modifications of air preheaters and blower for the oxidation towers.

Fig. 6 is a semi-diagrammatic side elevation of a modified form of oxidation tower which may be used in place of the tower shown in Fig. 3, certain parts being shown in an exaggerated scale, other parts on section for clarity.

Figure 10:
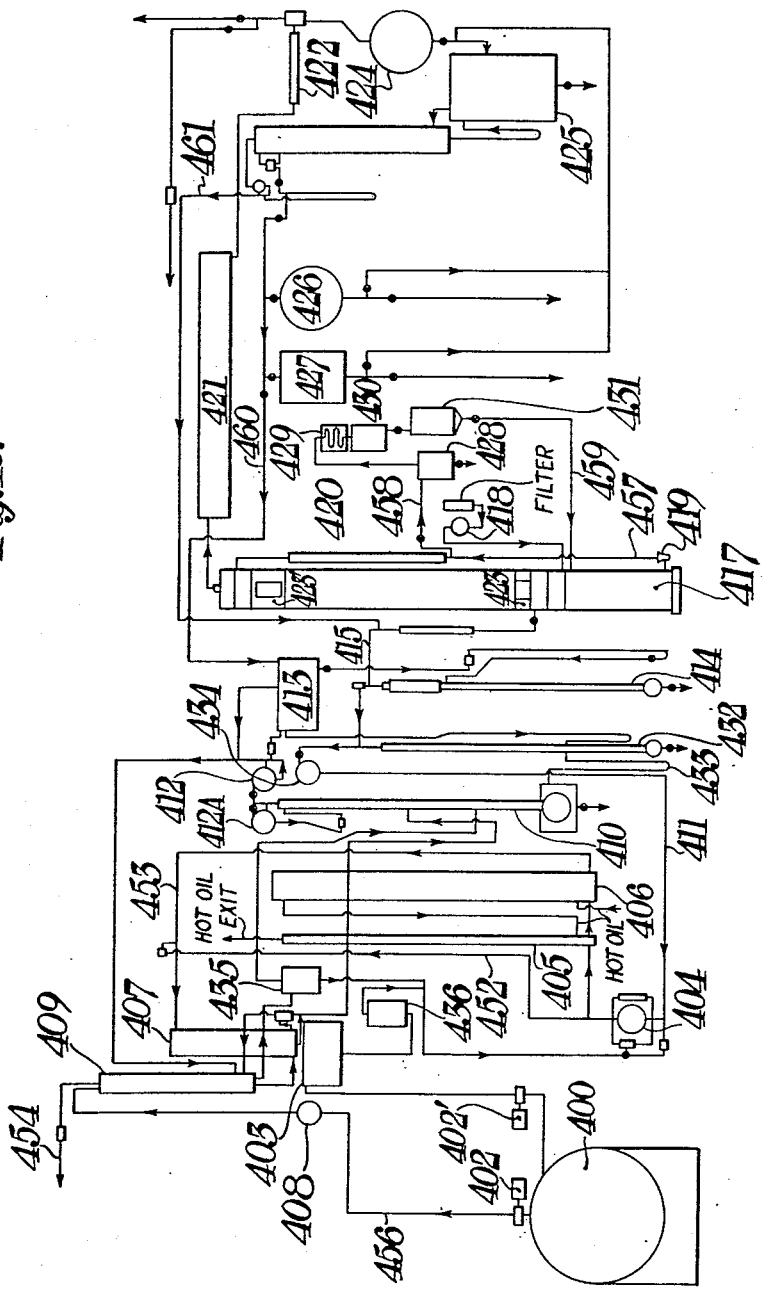

Figs. 7, 8, and 9 are sectional views taken on the lines A—A and B—B of Fig. 6, and line C—C of Fig. 8.

Fig. 10 is the same type of view as Fig. 1 of a modified plant layout of apparatus and process flowsheet for practicing my invention.

Fig. 11 is a semi-diagrammatic side elevation of an alcohol vaporizer structure that may be employed in place of alcohol vaporizer 4 of Fig. 2, it being understood that this and the various other pieces of apparatus which are being shown individually may be employed in either of the setups shown in Figs. 1 and 10.

Fig. 12 is a semi-diagrammatic side elevation on a larger scale of an alcohol preheater or superheater that may be employed in place of the preheater 5 of Fig. 2. Certain parts have been shown broken away and on section for clarity.

Fig. 13 is the same type of view as Fig. 2 of a modified form of catalyst unit and associated parts represented in Fig. 2 as at 8.

Fig. 14 is a side elevation of a modified form of oxidation tower which may be used in place of the tower structure 301 of Fig. 6.

Figs. 15 and 16 are sectional views taken on the lines D—D of Fig. 14 and E—E of Fig. 15.

Fig. 17 is the same type of view as Fig. 16 but represents the structure of a cooling section at a higher position in the tower of Fig. 14.

Fig. 18 is a semi-diagrammatic side view on a larger scale of one type of tunnel or bubble cap construction represented in Fig. 9 at 321 and 322, certain parts being shown on section for clarity.

Fig. 19 is a sectional view taken on the line F—F of Fig. 18.

Fig. 20 is a schematic diagram of an arrangement of connections for automatic control of the catalyzer units in either Figs. 1 or 10.

Fig. 21 is a diagrammatic side elevation showing another plant layout of apparatus and process flow sheet for practising my invention.

Fig. 1 may be understood to a large extent merely by reference to the legend appearing on the drawing. However further consideration of Fig. 1 will be had under the description hereinafter concerning my new dehydrogenation-oxidation process employing propyl alcohol. The treatment of this alcohol is described merely for the purpose of illustration and the use of my process and apparatus is not to be construed as limited to the treatment of propyl alcohol.

However, in respect to Fig. 1 there are certain features that require description at this time. It will be noted from Fig. 1 that catalyzers 8 and 8' are preferably employed in duplicate or parallel, to allow for the activation of the catalyst in one chamber while the other chamber is in operation. In order to accomplish this, the conduits connecting the catalyzer must be suitably arranged. One manner of arrangement is as follows:

Conduit 46 is extended by means of conduit 72 to the base of catalyzer 8'. Valves 71 and 71' are provided in both conduits in order that one catalyzer may be cut out and activated without interference with the operation of the other catalyzers. Another conduit, designated 81, connected with the source of the activating materials is joined to the base of catalyzer 8 and 8' by means of branch conduits 82 and 82'. Valves 73 and 73' are inserted at any suitable point in these conduits to assist in controlling the imput of activating gases.

Joined to the opposite end of catalyzers 8 and 8' are exit conduits 74 and 74' provided with valves 76 and 76'. These conduits are connected to conduit 80 which leads to a series of condensers and other units of the apparatus described more fully hereinafter.

Conduits 74 and 74' are also joined by means of the valved branch conduits designated 77 and 77' to the escape vent or conduit 79. While in some instances I have shown the various conduits as being connected to the head closure and in other instances connected on the side, it is to be understood that the conduits may be connected in either position. Also there are various other modifications which may be instituted such as for example: three or more catalyzers may be employed, the activating gas supply tubes 82, 82' or escape vents 77, 77' may be connected directly to the sides of the catalyzer units.

In place of the valve arrangement just described, it is generally desirable on a large installation to employ an automatic valve system such as shown in Fig. 20, for example.

In the conduits carrying and exhausting the catalyzer 8' with activating materials are placed direct action valves 501 and 502. In the corresponding conduits connected with catalyzer 8 are placed reverse action valves 503 and 504. All of these valves are connected to a master switch 507.

By this arrangement of direct and reverse action valves of Fig. 20 throwing the master air switch 507 will necessarily close the valves on one side of the system if the valves on the opposite side are opened.

In addition, the master air switch 507 is connected to the two way valves 505 and 506 in the alcohol vapor feed line 46 and discharge line 80. These two way valves are set so they will throw in a manner that the alcohol vapors will be conducted to the catalyzer system in which the valve of the activating lines are closed.

Consequently, by a single throw of the master air switch the proper valves are opened and closed. Since in the present process certain gases, such as hydrogen, are given off, the above described automatic arrangement of valves eliminates to a large degree any hazard that might arise from operators closing or opening the wrong valves thereby permitting hydrogen to become mixed with air or oxygen with the resultant danger of explosion.

While air-actuated mechanism has been described, electrically or other type of automatic operation of the valves would be suitable. It is, of course, apparent that this automatic system may be employed in the plant layout of Fig. 10 or modified plant layouts.

The function of these various parts will be readily understood from the description hereinafter under catalyst activation and regeneration.

In Fig. 2, the numeral 30 represents a vertical extending tower or shell provided with a head 31 and a base 32. This tower or shell is preferably of cylindrical form and will have the head and base securely fastened thereto. The lower portion of this tower comprises an alcohol vaporizer 4 and the upper part an alcohol preheater or superheater 5. Between the vaporizer and preheater is a chamber 33 of substantial size which contains a baffle plate 34.

The vaporizer construction is of the boiler type and comprises a plurality of vertically extending tubes 36. These tubes are positioned within the tower 30, a small distance above the base 32 so that a base chamber 37 is formed. The tubes extend vertically a distance of approximately one-fourth to one-third of the height of the tower. The upper end of the tubes terminate in the lower portion of chamber 33. The tubes are supported both on the upper and lower ends in any of the well known manners of boiler construction such as by tube plates or sheets 35. The tubes may be heated by steam, oil, or other suitable source of heat injected at 38 and withdrawn at 39 or vice versa.

The preheater or superheater structure is similar to that of the vaporizer structure and comprises a plurality of vertically extending tubes 39 adapted to be heated by fluid heat, such as steam supplied at 41 and withdrawn at 42. These tubes are positioned a small distance below the head of the tower 31, in order to form a chamber 43, and extend downwardly to a short distance above the baffle 34. Suitable means 35, such as tube sheets or the like are affixed at each end of the tubes to support the tubes and to prevent the heating medium, which circulates around the tubes, from escaping into the alcohol heating passages.

Leading into the base chamber 37 is a supply pipe 44 through which the alcohol to be vaporized is introduced. Leading from the top chamber 43 is a conduit 46 of substantial dimension for conducting the vaporized alcohol from the preheater to the catalyst unit. Since the change of the liquid alcohol to alcohol vapor is accompained by a volume increase, conduit 46 should be of suitable size to provide easy passage of the alcohol vapors.

The conduit 46 leads to the base of a vertically extended catalyzer unit 8. In the preferred construction this catalyzer unit of a vertical tube type consisting of 200—300 boiler type tubes, designated 60, with the dehydrogenation catalyst contained in the tubes supported on a bronze screen bottom or plate 61. These tubes are housed in a casing 62 provided with a head closure 63 and a base closure 64. The tubes are positioned a short distance above the base 64, and below the head closure 63 in order to define the base chambers 66 and head chamber 67. Both the upper ends and lower ends may be suitably supported and partitioned off by means of tube sheets or the like 65 so that a heating medium may be circulated about the vertically extending tubes. I prefer to employ hot oil injected at 68 and withdrawn at 69 as the heating medium although it is possible to use other heating mediums or even heat electrically or employ heated metallic materials. For example, other suitable heating mediums are mercury vapor heating or mixtures of diphenyl and diphenyl oxide. These heating mediums, per se, form no part of my invention and their use is described in Chemical and Metallurgical Engineering April 1932.

While I have described a single catalyzer, as may be seen from Fig. 1, I prefer to employ at least two vertically extending catalyzers for increased efficiency, although it is to be understood a single catalyzer is operative. This second catalyzer is of duplicate construction, hence needs little further description. This duplicate catalyzer 8' may be connected in parallel with catalyzer 8 in the manner clearly shown and described under Fig. 1, namely, branch conduit 72 is extended from conduit 46 to the base chamber of catalyzer 8'. Suitable valves being provided, as at 71' and 73, in order to permit the vaporized alcohol to be conducted past catalyzer 8 to catalyzer 8', when catalyzer 8 is being activated, and to permit the activating gases to be introduced into the catalyzer being activated. By means of a similar arrangement of valves 76, 76', 77, 77' and conduits 74, 74' and 80 the catalyzer heads may be connected with either the gas escape conduit 79 or condensers 10 and 11. Or in place of this arrangement, the system of automatic valves of Fig. 20 may be employed in this or any other set up shown.

The condenser designated 10 is designed to be cooled by circulating water. It comprises a horizontally extending shell 90 (Fig. 2) divided by transversed plates or tube sheets 91 and 92 into receiving, condensing, and discharge chambers 93, 94, and 96. The chambers 93 and 96 are provided with inlet and outlet pipes 97 and 98. A plurality of tubes 99 extend through the chamber 94 formed by the tube sheets 91 and 92. Provision is made for introduction of the exit vapors from the catalyzers through the conduit designated 100. These vapors pass over the water cooled tubes 99 and are partly condensed and escape through exit conduit 101 which leads to ammonia cooled condenser 11.

This ammonia condenser is of a structure similar to the condenser just described, differing therefrom primarily in that the cooling medium is supplied to the conduit 110 and escapes through conduit 111. In this condenser the vapors to be condensed flow through tubes 112 surrounded by ammonia or other suitable cooling medium of that character, whereas in condenser 10, it will be noted that the vapors to be condensed flowed over the tubes. The combination of two types of condensers in series, as described, enables an efficient cooling of the vapors coming from the catalyzers and is an important feature in providing a means of separating the reaction constituents. All of the ammonia condensers and water condensers shown on Fig. 1 are of the same type construction just described.

I also contemplate employing two or more condensers of the same construction as condensers 10 and 11, connected by valved conduits to conduit 100 and in parallel with condensers 10 and 11. By this arrangement should any water freeze out in condensers 10 and 11, either condenser would be cut out and permitted to thaw, the other parallel condensers being put into use.

As a further refinement, I may introduce a water scrubber for washing the hydrogen coming off from the ammonia condensers. This feature will be more fully described hereinafter.

In Fig. 3 the numeral 17 represents an oxidizing column. A portion of the column is broken away to show the internal construction of the column in diagrammatic form. For carrying out my process of catalytically oxidizing propionic aldehyde to propionic acid, I have found a column of approximately 30–50 plates construction to be suitable, although, other size columns or the other new oxidation units herein disclosed may be used.

The oxidizing column 17 is of bubble plate construction and comprises a vertically extending shell or tower 200 having a base closure 201 and a head closure 202. At the bottom of the column there may be provided an air preheater 19, or merely an air supplying conduit. The structure of the air preheater will be fully described under Figs. 4 and 5. The air preheater 19 and/or air blower is provided with a pipe 203 by means of which the air may be blown into the column. The bottom portion of the column comprises about three or four regular plate sections 230 of standard bubble cap construction. Blowing air or oxygen into the catalyst solution on these last three or four plates serves to oxidize any aldehyde present and to keep the catalyst in a high degree of activity particularly if the air is supplied under a slight pressure.

At a point intermediate of the column, and at the plate section adjacent the standard plates just described, is provided an inlet pipe 18 for the introduction into the column of aldehyde from the aldehyde feed tank 16 shown in Fig. 1. This feed tank or the tank feeding it is mounted, preferably, to some extent above the inlet pipe in order that the aldehyde will flow into the column by means of gravity. Inlet or feed pipe 18 extends into the column where it discharges onto flash plate 206. This plate is heated by steam coils 207 which are welded or otherwise securely fastened to the bottom of the plate. The steam coils are provided with a condensate pipe 208.

I have found that best results are obtained by oxidizing freshly distilled aldehyde as will be described in more detail with respect to the flow diagram of Fig. 10. However, in the instant set up of Fig. 1, a still may be interposed for or in addition to feed tank 16 whereby freshly distilled aldehyde could be supplied to column 17.

Immediately above the flash plate is a baffle 209 (Fig. 3) with a hole in the center. Above this baffle is a perforated plate 211 which performs the function of completely mixing the vapors as they pass to the upper units of the column. The remainder of the column or tower may be of any standard bubble plate construction designated 210, hence, requires no further description. Connecting these various standard sections is the overflow pipe 215. However, I also contemplate employing the bubble plate construction comprising the tower shown in Fig. 6.

The top of the column is provided with a vapor outlet pipe 212 connected with the condenser 23 which may be cooled with any suitable medium, but preferably by ammonia. Any condensate accumulating in the condenser 23 is conducted to weir 214 and away by means of conduit 213.

The bottom section of the column is provided with an outlet conduit 220 which leads to pump 21. Pump 21 is connected by means of pipe 228 with a temperature regulating device 22 which in turn, is connected by conduits 222 and valved conduits 24 with the upper plate sections of the column, the function of these units being to constantly circulate the catalyst solution through the tower and then through the temperature regulating device 22 whereby the catalyst solution is brought to the proper temperature and then returned to various points in the column. This feature permits more uniform control of the reaction throughout the tower. This type of unit may be replaced by other types of catalysts temperature controllers provided such devices are located in a proper position on my tower.

In Fig. 4, 250 represents a box preferably made of sheet metal and rectangular in form with an open discharge end away from the fan for communicating with the oxidizing tower of either Fig. 3 or Fig. 6. A header 251 passes through the ends of this box near one of its upper corners. Upon its projecting ends suitable cut-off valves 252 are placed and one of these projecting ends is connected with a source of heat such as a steam boiler, while the other end is connected to an exhaust pipe. On another corner of the box 250 is a similar header pipe 253 having both ends projecting for the purpose of live steam and exhaust connections. These header pipes are connected together by a plurality of steam coil pipes 254. While I have shown transversely extending pipes, various radiator devices may be employed as will be observed in the description of Fig. 5.

One end of the radiator box or housing 250 is provided with a fan assembly 256 which may be driven in any suitable manner such as by the belt pulley 257. Or the fan shaft may be connected directly to an electric motor. For example, a direct current motor with a speed regulator could be provided. Or for alternating current circuits, a variable speed single phase motor with controllers could be employed. The fan drives the air into the radiator chamber 250 where it comes in contact with all or nearly all radiator surfaces of the pipes, the steam coils and headers and then the heated air is forced into the oxidation column.

Fig. 5 represents an air preheater assembly which is very similar to the one described under Fig. 4 but differs, therefrom, primarily in the radiator construction. The heating box in this assembly contains the vertical extending fin type radiator 260 provided with the top and bottom headers 261 and 262 to which the heating medium may be supplied. Another point of difference is in the fan 264 which is designed to have a large blade area supported on a hub disk 266 with a large diameter. This type of construction permits a low operating speed, efficiently directs the air over all the heating tubes and prevents short circuiting of the air around the hub of the fan. Both this fan and the fan of the preceding assembly may be formed from pressed steel. The fan 264 is provided with the fan housing 267. The radiators and headers may be formed of bronze castings, copper or bronze covered with copper.

While I have shown the fans positioned to force the air through the heating tubes and into the oxidation tower, it is possible to place the fan between the heating coils and the tower and suck the air through the heating coils after which it is forced into the tower. As to the specific air preheater construction, I make no claims per se, but I believe I am the first to successfully combine the air preheater constructions described with catalytic oxidation tower of the type shown to produce highly efficient oxidation towers.

The use of these preheater structures is optional as the process will function with the oxidizing medium at various temperatures. However this set up assists in controlling the tower. In any event it is desirable to employ a fan structure to force the air into and through the tower under some pressure, therefore, the above disclosure contemplates the omission of the tube heating elements and employing merely the blower structure to force the gaseous mediums through any of the oxidation units shown.

In Fig. 6 is shown an improved oxidation tower 301. This tower is preferably cylindrical in shape and comprises a base 302 and the top or head 303. The interior is made up of large number of plates or pans 304 having central openings 306 covered by hoods or bells 307. The edges of these hoods are sealed in the liquid carried by the plates or pans. The adjacent plates are connected by overflow pipes 308.

Positioned intermediate of the column is a cooling section of a special construction designated 309 and shown in detail in Fig. 7. This section includes the longer, enlarged air conduit 310 and the overflow pipe 311. Also a baffle 315 may be included to assist in causing the catalyst solution to flow around the cooling coils.

The cooling means 313 comprises, as may be seen from Fig. 7, vertical header pipes 314. Branching from these headers are a plurality of horizontal tubes 316 through which the cooling fluid may be circulated. Inlet and outlet pipes are provided at 317 and 318. Or in place of this cooling section, the cooling sections shown in Figs. 15, 16 and 17 may be employed. The use of these latter type cooling sections will be more apparent as the description proceeds.

Positioned above this special cooling section 309 is one or more sections of regular structure 319 and above this section may be a plurality of cooling sections and regular sections arranged alternately. These other cooling sections, designated 320 and shown in detail in Fig. 8, comprise a cooling coil 321 of circular or other suitable shape of zigzag construction positioned above a plate containing a plurality of bubble caps 322 shown in detail in Fig. 9.

The object of these cooling sections and their positioning is to provide an adequate graduated cooling in the entire reaction zone as contrasted with localized cooling.

Intermediate of the column and at a point below the special cooling section 309 are inlet pipes 323 and 324 for introducing an oxidizing fluid into the column. A branch pipe or pipes 326 is provided for introducing the oxidizing gas at higher points in the column. All of these pipes are connected with means which supplies the oxidizing medium such as, for example, blower 327.

In place of this blower the air preheater 19' may be employed. This air preheater is of the same structure as described under Figs. 4 and 5 and, it will be remembered, contains a fan or blower in its structure.

Also positioned at points intermediate of the column, above and below the special section 309 are a plurality of aldehyde inlet feed pipes designated 329. This construction is of importance in that by means of the plurality of inlet pipes for the oxidizing gas and the aldehyde a smoother and more efficient reaction may be carried out. That is, instead of large quantities of aldehyde and oxidizing medium contacting and reacting at one point in the reaction column thereby liberating a large amount of heat at one place, because the reaction is exothermic, in my process the reaction is caused to be spread over a larger area in the column. This permits a more uniform dissipation of reaction heat which might otherwise be taken up by the reaction products producing undesirable decomposition of the acids which the process is designed to obtain.

This feature of distributing the reaction over a wide area is an important part of the oxidation step and apparatus shown herein.

Leading from the base of the oxidation column to the pump 331 is the conduit 332 through which the catalyst solution in the column may be withdrawn and circulated through pipe 333 to the catalyst heater 334.

In the catalyst heater which is heated by means of steam supplied and withdrawn through the various pipes 336, the catalyst solution is raised a few degrees in temperature after which it is introduced by means of conduit 337 into the head of the column. By introducing this heated catalyst solution into the head of the tower the solution in this part of the tower is maintained at a higher temperature than other points in the tower.

This causes the acid formed and contained in the catalyst solution to be liberated and recovered therefrom.

In the preferred operation of my process, assuming propionic acid which has a boiling point of about 141° C. is being produced; it is only necessary to maintain the catalyst solution entering at 337 at temperatures around 100–110° C. to recover the acid containing vapors therefrom.

According to my preferred process air, with or without other diluent materials such as hydrocarbon gases, is employed as the oxidizing medium. Since air is comprised roughly 80% of nitrogen and other inert constituents, these inert materials and any others which may be added exert a partial pressure effect on the acid vapors thereby permitting volatilization of the acid vapors at these lower temperatures.

Since the catalyst solution itself contains acid of the character being produced, in order that the acid removed will not be from depleting the catalyst solution, a sight gauge or other device may be placed on the tower so that the level of the catalyst solution therein on the various plates may be observed.

If the quantity of catalyst solution with which the tower was originally charged should begin to drop, less heat would be supplied at 336 to reduce the quantity of acid vapors being liberated from the tower, thereby preventing acid being removed from the catalyst solution.

The above structure also replaces the customary dephlegmator structure sometimes employed on towers.

These acids containing vapors are conducted through the outlet conduit 340 into the water cooled condenser 341, supplied with a cooling medium at 342, where most of the vapors are condensed. The main condenser 341 has attached to it a secondary condenser 343 which is operated with a refrigerant and serves to condense substantially all of the condensable vapors not condensed in the main condenser. The condensate from the condensers is conducted by means of the pipe 344 to the feed heater 346 where it is fed into the distillation column 347.

This distillation column 347 is of bubble plate construction and provided with a base heater 348. At the base of the column and at intermediate points in the column are provided off-take conduits 349, 350, 351 and 352 through which various constituents obtained in the distillation column may be withdrawn, for example, the propionic acid vapors may be taken off through the conduit 350. The top of the column is provided with an outlet conduit 353 which leads to the plurality of aldehyde inlet pipes 329. Any unreacted aldehyde can be distilled off in the distillation column 347 and injected back into the oxidizing column by means of these pipes. Suitable valves are provided in the various conduits. Also aldehyde supply may be cut into feed heater 346 or any of the conduits 329 or 353 as at 345, for example.

It is also an important feature when the type of tower shown in Fig. 6 is employed, that the process may be operated with an insufficient amount of oxidizing medium to oxidize the propionaldehyde to acid, inasmuch as the production of acetic acid and other by-products are thereby reduced.

The catalyst chambers 8 and 8' described in detail under Fig. 2 are filled with a suitable dehydrogenation catalyst. Since my process includes the important feature of activating the dehydrogenation catalyst with the hydrogen liberated in the alcohol dehydrogenation step or with alcohol of the character being employed in the process, the choice of the particular catalyst is of importance and in my preferred embodiment should be a catalyst which is capable of being activated by the hydrogen liberated as aforesaid.

The catalyst employed in my process preferably comprises copper or an oxide thereof. If desired, other constituents such as magnesium oxide, zinc oxide, alkali and alkaline earth compounds such as carbonates, borates and the like may be added. It would also be possible to utilize a catalyst somewhat similar to that disclosed in U. S. Patent No. 1,122,811. However, I prefer to employ the copper pellet type catalyst to be described in detail hereinafter. If the non-pellet type catalyst is employed, I prefer to support the same on a suitable support such as carborundum. That is, the life of the non-pellet type dehydrogenation catalyst is longer when deposited on "Carborundum". Also it holds its activity over the entire period and is not greatly less active than when first put into use, its activity dropping abruptly at the end. Whereas in a case of the pumice supported dehydrogenation catalyst, the activity begins to fall and continues to gradually fall off in activity from the time it is put into use until, at the end of the period of use, the activity may be such that only a materially smaller quantity of alcohol will be converted per pass.

Another type of catalyst which is a very satisfactory catalyst may be prepared as follows: A good grade of copper is brought to the molten state and then blown at a temperature of between melting and about 1200° C. with air or other oxidizing medium. These steps may be carried out in a converter or reverberatory furnace. The molten copper oxide is allowed to solidify, is broken up and sized to two to five mesh. Specifically about 1100° C. is a satisfactory temperature. Making this catalyst by blowing copper at about 1100° C. or above at which temperatures cupric oxide is unstable results in the production, namely, of only cuprous oxide which when solidified has a brick red color. Consequently this catalyst is to be distinguished from known catalysts comprising cupric oxide or partially reduced cupric oxide. Fused cupric oxide is black.

It is then placed in the catalysts tubes of any of the catalyzer units shown herein and reduced to metallic copper by means of hydrogen and/or alcohol vapor this being the case of propionaldehyde manufacture, propyl alcohol or hydrogen obtained previously in the process.

After the copper catalyst is obtained in the reduced form, a solution of magnesium carbonate, or other carbonate described, is poured down through the catalyst tubes, thereby coating the surface of the reduced copper particles with a metal carbonate. Some of the advantages of this form of catalyst prepared as indicated are that it leads to less loss by dusting than if in a precipitated form or gauze form of copper oxide. This form of catalyst is very porous and holds its activity for a considerable period before requiring activation (regeneration) or replacement. As a matter of fact with proper regeneration its life may be extended indefinitely.

The copper oxide produced as above described, may be treated with alcohol and/or hydrogen for a period of around 40 hours and then the carbonate and/or oxide, say from about .5% to 5% added as described. Or the carbonate and/or oxide can be added soon after the copper material has been placed in the catalysts tubes.

Another type of copper catalyst may be prepared by blowing (bessemerizing) copper materials, decomposing copper salts, melting copper, or by any other suitable procedure preparing a bath of molten copper. This molten copper, preferably in the reduced condition, is then granulated such as by pouring into water. The copper stream may be broken up by pouring through a screen before reaching the water if desired. Or other procedure such as that employed in operating a shot tower, or breaking up by means of inert gas may be carried out to obtain copper of a spherical shape which is partially hollow or porous. These particles of copper are then sized 2–5 mesh and may be charged into the catalyzer units as already described with respect to the other catalysts set forth herein.

A carbonate content of the group described, preferably magnesium, may be applied to the copper particles either before being placed in the catalyzer tubes, or by pouring down the tubes after the catalyst has been charged. For convenience I may generically designate the aforedescribed quenched pellet type catalyst, having low dusting losses, as a substantially dustless catalyst essentially comprising copper initially obtained from cuprous oxide prepared by blowing molten copper with an oxidizing medium.

In respect to this catalyst, when regenerating, as will be described hereinafter, it is desirable that the flushing treatment be continued for a sufficient period to remove any hydrogen contained in the hollow centers of the copper particles.

After the apparatus has been assembled, as shown in Figs. 1 and/or 10, for example, the equipment is ready for operation. The following example is an illustration of my preferred process, reference being made in particular to Fig. 1 of the drawings for an understanding thereof. At the onset it is to be understood that in the following description of my process, the specific materials and the like set forth therein are merely for the purpose of illustration and not to be construed as limiting the invention.

The propyl alcohol contained in storage tank 1 is passed through pump 2 into feed tank 3 which is provided with a fluid valve. Thence the alcohol feeds into the vaporizer 4 from which the alcohol vapors rise and are heated in superheater or preheater 5 to a temperature of about 300° C., (about 572° F.), the vaporizer being heated with steam and the preheater with oil. The preheating temperature is governed by the temperature controller 6 in the alcohol vapor line which in turn is connected to regulators which regulate the hot oil in 5. The speed of alcohol vaporization can be controlled by a flow meter inserted at a suitable point to regulate the steam supply heating vaporizer compartment 4.

The propyl alcohol vapor preheated to about 300° C., (about 572° F.), passes through catalyst units 8 or 8' which, as already indicated, operate alternately. This feature of preheating the propyl alcohol to about 300° C., (about 572° F.), is useful in increasing the through-put of the reaction chamber, but with the type of catalyzer shown in Fig. 13, preheating may be dispensed with if desired.

For heating the catalyst tubes 8 or 8' a circulating hot oil system or other suitable heating medium already referred to would be employed operating at a top temperature of between 585° F. (about 307° C.), and 617° F., (about 325° C.), the alcohol passing through the catalyzer tubes yields a reaction product comprising principally aldehyde, hydrogen and unconverted alcohol: Favorable results are obtained with a reaction temperature of a little above 300° C. and a space velocity in the catalyst chamber of approximately 75–1000 cubic feet of alcohol vapor per cubic foot of catalyst per hour. These conditions may be varied somewhat. For example, reaction temperatures from 270° C.–360° C. and space velocities of from 75–1200 could be employed. Space velocities of between 75–400 are however preferred.

These reaction products pass out through either conduit 74 or 74' depending on the catalyzer in operation, into the conduit 80 which conducts the reaction products into the water cooled condenser 10. Thereafter the reaction products are conducted into direct ammonia evaporation condenser 11 which is operated to drop the temperature to below 32° F. but above the freezing point of the reaction products mixture thereby causing the condensing out of substantially all of the aldehyde and unconverted alcohol. The hydrogen leaving the bottom of the ammonia condenser, which of course is still gaseous, may be water scrubbed, if desired, and then pumped by means of gas blower 7A into gas holder 7B. By means of the cooling step and scrub, I am able to effect a satisfactory separation of the hydrogen. This cooling, however, should not be so drastic as to cause much of the water in the reaction products to freeze in the condensers. Since this water is mixed with unreacted alcohol its freezing point is lowered, hence the condenser temperature is governed to some extent by this alcohol content. It should be noted with respect to Fig. 10 that I have shown another modification of removing the aldehyde by scrubbing with alcohol.

The condensed alcohol and aldehyde pass into fractionating column 12 where it is subjected to a distillation treatment. The aldehyde passing out of the dephlegmator 13 is condensed in ammonia condenser 14 and passes to storage tank 15. The alcohol tail product can be returned to the alcohol feed. A further refinement in either the process of Fig. 1 or 10 would comprise refining this alcohol and any other alcohol being returned to feed, before passing it through the catalyzers. This procedure is set forth in detail in respect to Fig. 21. If aldehyde is the only product which it is desired to produce the process stops at this point, however, if it is desired to utilize the aldehyde for producing acid, for example or if both aldehyde and acid are to be produced, the process is continued as follows:

Part or all of the aldehyde can be drawn from the storage tank 15 into feed tank 16 and thence to the vaporizer of flash plate 206, shown in Fig. 3, provided in about the fourth plate section of the oxidation column 17. Or, in order to supply freshly redistilled aldehyde, a distillation column may be interposed, as at 16, to furnish freshly distilled aldehyde to the column.

Air is introduced into the oxidation column through the air preheater or blower 19 and upon its being blown into the column, the aldehyde vapor becomes quickly oxidized to the corresponding acid. A contact time of about 25 seconds in the set up shown appears satisfactory. In place of column 17, I may employ the tower shown in Figs. 6 or 14.

I have described the use of condensers and aldehyde storage tanks interposed between the distillation column 12 and the oxidation column 17 in order to permit the production of aldehyde or acid in the same set up. In the event that all the aldehyde produced in the first step is to be converted into acid, the various units 14, 15 and 16 as well as flash plate 206 or any one or combination thereof may be dispensed with or piped around. The freshly distilled aldehyde vapors from fractionating column 12 can then be conducted directly into oxidizing column 17 through valved conduit 18, designed to conduct the aldehyde vapors directly from the column to the oxidation tower.

For the purpose of further illustration, tabulated below is the data on a run exemplifying my process as applied to n-propyl alcohol, it being understood that while I wish to emphasize my process as applied to propyl alcohol and while the process is particularly adapted thereto, useful results may also be obtained by applying a similar treatment to butyl alcohol and other related alcohols.

| | |
|---|---|
| Time of run | 4 hours, 11 minutes. |
| Alcohol fed | 5,376 grams. |
| Space velocity | 995 c. c. gas per c. c. catalyst per hour (calculated from alcohol fed, not allowing for expansion due to reaction). |
| Alcohol recovered | 4,364 grams. |
| Alcohol used up | 1,012 grams. |
| Conversion per pass | 18.8%. |
| Theoretical yield of aldehyde | 878 grams. |
| Obtained as propionaldehyde | 869 grams. |
| Found in scrub water by titration | 23 grams. |
| Total aldehyde | 892 grams. |
| Yield | 91.2%. |
| Volume of off gas | 18.16 cu. ft. or 448 liters at standard temperature and pressure. |

Average composition of gas—(air free basis)

| | Percent |
|---|---|
| $CO_2$ | 0.37 |
| $C_3H_8$ | 0.25 |
| CO | 0.31 |
| $C_2H_6$ | 0.00 |
| $H_2$ | 96.8 |

Material balance—98.55% of alcohol fed accounted for.

The reactions occurring in the dehydrogenation are as follows:

$$\underset{\text{Propyl alcohol}}{C_3H_8O} = \underset{\text{Propionaldehyde}}{C_3H_6O} + \underset{\text{Hydrogen}}{H_2}$$
$$\underset{\text{Butyl alcohol}}{C_4H_{10}O} = \underset{\text{Butyric aldehyde}}{C_4H_8O} + \underset{\text{Hydrogen}}{H_2}$$

As indicated above, the respective aldehydes may be, if desired, further utilized as, for example, converted to the corresponding acids.

After the dehydrogenation catalyst has been in use for several hours, its efficiency becomes lowered and it is desirable to activate or regenerate the catalyst. The use of catalyzers in duplicate or triplicate connected in parallel permits ready activation without interruption of the dehydrogenation process.

Assuming that catalyzer 8 of Fig. 1 is the unit to be activated, the valve designated 71 would be closed and valve 71' opened so that the alcohol from the super-heater 5 would be passed to catalyzer 8'. The valve 76 in the line leading from the top of catalyzer 8 would be closed and the valve 77 would be opened. The valve 78 would be open and valve 78' closed. The catalyzer 8 is first treated with a gas introduced through pipes 81 and 82, sweeping out any reaction gases that may be in the catalyst chamber. For this purpose an inert gas such as flue gas could be employed or a semi-inert gas such as producer gas could be employed, also, steam alone or a mixture of these materials is satisfactory. Producer gas contains large quantities of nitrogen, carbon dioxide, and other constituents and has a smaller explosive range than hydrogen, hence it may be used for sweeping or flushing out the catalyzer. When I refer to flushing or sweeping out the catalyzer I refer to employing a material of this character.

The next step is to pass an oxidizing gas such as air through the catalyzer, the chamber being kept at a temperature of about 560° F. (about 260° C.). An air blow using about 45–55 cu. ft. per minute for a period of about one-half to two hours would be satisfactory. This air may be obtained from any source or may be tapped off from the air preheater attached to oxidation column 17. In this operation valve 78 would be closed and valve 78' opened.

After a thorough oxidation treatment, the catalyzer may be flushed out and hydrogen, which is a by-product from the de-hydrogenation step, passed through the apparatus from the gas holder 7B. This hydrogen has the desired characteristics and does not injure the catalyst, whereas if industrial hydrogen were employed there are some possibilities that such hydrogen might contain impurities which would poison the catalyst. Furthermore, this step furnishes an economical outlet for the hydrogen produced in the process. Thereafter the valves in the regenerating gas lines are closed and the catalyzer is cut back into the alcohol lines and is ready for operation again. Or, in accordance with my preferred procedure, in place of the hydrogen blow, alcohol of the character under treatment would be passed through to fully reduce the catalyst, or, alcohol and the hydrogen may be employed together.

While I have described the series of steps for regenerating the catalyst as comprising (1) flushing, (2) oxidizing, (3) flushing, and (4) alcohol and/or hydrogen treatment, and prefer to employ all of these steps, it is possible under some circumstances to omit some steps.

When employing the automatic valve arrangement of Fig. 20 the operation is as follows, assuming catalyzer 8 is in need of regeneration and catalyzer 8' has been conditioned:

The master switch 507 is thrown and this lets compressed air into the line. This closes direct action valves 501 and 502 and throws two-way valves 505 and 506 so that the catalyzer 8 is cut out and alcohol vapors pass from line 46 through catalyzer 8' and out conduit 80. On the other line, the air opens reverse action valves 503 and 504 to permit the activating treatment just described.

There are a number of modifications that may be introduced into my process and the following is a description of some of these changes.

In places of the apparatus set up shown in Fig. 1, the following example is an illustration of a modified process, reference being made in particular to Fig. 10 of the drawings for an understanding thereof. It is to be understood that in the following description of my process, the specific materials and the like set forth therein are merely for the purpose of illustration and not to be construed as limiting the invention.

The propyl alcohol contained in storage tank 400 is passed through pump 402' into feed tank 403 which is provided with suitable valves. Thence the alcohol feeds through cooler 436, which prevents vapors coming back up the line, into the vaporizer 404 from which the alcohol vapors rise and are heated in superheater or preheater 405 to a temperature of about 300° C. by means of the hot oil that has been employed in heating catalyzer 406, the vaporizer being heated with steam. The pressure in the system is controlled by the pop line 452 connected in both the vaporizer and catalyzer lines.

The propyl alcohol vapor preheated to about 572° F. passes through catalyst unit 406 which, as already indicated with respect to Fig. 1 may be in duplicate and operate intermittently. This feature of preheating the propyl alcohol to about 572° F. and dehydrogenating just above 572° F. is an important feature in my new process in that these temperatures are obtained by passing the hot oil to the catalyzer and then to the preheater. Heating the catalyst tubes 406 with a circulating hot oil system operating at a top temperature of 617° F. cools the oil down to a lower temperature whereby it may be used for preheating.

The alcohol passing through the catalyzer tubes yields a reaction product comprising principally aldehyde, hydrogen and unconverted alcohol. These reaction products pass out through conduit 453, assuming the one catalyzer in operation, into the condenser 407. Thereafter the uncondensed reaction products are conducted into a scrubbing unit 409 which is charged with cooled alcohol or other scrubbing liquid in the well known manner of the prior art, for example, note U. S. Patents 1,636,952, 1,426,449, 1,142,743 and 1,081,959. The scrubbing liquid is supplied through cooler 408 and conduit 456 thereby causing the washing out of substantially all of the aldehyde and unconverted alcohol. The hydrogen leaving the top of the scrubber 409, which, of course, is still gaseous, may be readily pumped by means of a gas blower through conduit 454 into a gas holder. By means of this scrubbing step, I am able to effect a satisfactory separation of the hydrogen. However, I prefer to employ the procedure described under Figs. 1 and 21 employing a water-cooled and ammonia condenser in series followed by scrubbing the hydrogen with a suitable agent such as water, water-alcohol or the like.

The condensed alcohol and aldehyde pass into fractionating column 410 where it is subjected to a distillation treatment. The absorbing liquid is passed to flash heater 435 where the aldehyde is separated and conducted to column 410. The alcohol may be sent to the alcohol vaporizer but preferably is sent to a refining treatment, as previously suggested, or to column 432. Part of the aldehyde vapors passing out of column 410 is refluxed through the dephlegmator 412A, the remainder is condensed in condenser 412 and passes to storage tank 413. Alcohol and water from the base of column 432 where the alcohol is recovered by azeotropic distillation or other treatment such as the refining described under Fig. 21, returned through condenser 434 and conduit 411 to the alcohol vaporizer 404 to be recirculated through the system.

If aldehyde is the only product which it is desired to produce the process stops at this point, however, if acid is the product desired or if both aldehyde and acid are to be produced, the process is continued as already described, and the aldehyde oxidized to acid.

Throughout the system shown in the several figures suitable valves thermometers, designated TR, meters, weirs, pop lines and valves to take care of excess pressure have been employed and shown, however, detailed description of these features appear unnecessary as they are well known features of construction.

The various pieces of equipment shown in Fig. 10 have the following construction:

In Fig. 11, showing the alcohol vaporizer, the numeral 404 represents a horizontally extending shell provided with ends 531 and 532. This shell is preferably of cylindrical form and will have the ends securely fastened thereto. The vaporizer construction is of the boiler type and comprises a plurality of horizontally extending tubes 536. These tubes are positioned within the shell 404 a small distance from the ends 531 and 532 so that chambers 533 and 537 are formed. The tubes are supported on both ends in any of the well known manners of boiler construction such as by tube plates or sheets 535. The tubes may be heated by steam or other suitable source of heat injected at 538 and withdrawn at 539 or vice versa. The alcohol liquid is fed at 540 and the vapor withdrawn at 534.

The preheater or superheater structure in Fig. 12 is quite different from the one shown in Fig. 2 and comprises the vertically extending shell 405 adapted to be heated by fluid heat, such as oil supplied at 542. Tubes numbered 548 are positioned within this shell a small distance below the header 545, in order to form a chamber 543, and extend downwardly to a short distance above the base 541. Suitable means numbered 549 such as tube sheets or the like are affixed at each end of the tubes to support the tubes and to prevent the heating medium, which circulates around the tubes, from escaping into the alcohol heating passages.

Leading into the baffled base chamber 547 is a supply pipe 544 through which the alcohol to be preheated or super-heated is introduced. Leading from the other side of the baffled base is a conduit 546 for conducting the heated alcohol from the preheater to the catalyst unit.

The conduit 546 leads to the base of a vertically extended catalyzer unit 406 (Fig. 10). This catalyzer unit may be of a vertical tube type, as already described in detail under Fig. 2, heated with hot oil, the hot oil being subsequently conducted from the catalyzer to the preheater 405 at 542. After passing through the preheater, it escapes at 561 to be returned for reheating. I prefer, however, to employ my new type of catalyzer which is shown in detail in Fig. 13.

Vertical tubes, positioned above a bronze screen 565 as described in detail under Fig. 2, are housed in a casing 562 provided wth a header 563 and a base closure 564. The tubes are positioned a short distance above the base 564 and below the header 563 in order to define the baffle containing base chamber 566 and the baffle containing header chamber 567. These baffles, 568 and 568' extend entirely across the chambers and partition the chambers off so that the alcohol vapors entering at 571 make four passes before leaving at 572 to be conducted by conduit 453 (see Fig. 10) to condenser 407. This is an important and novel feature of my new catalyzer structure. Both the upper ends and lower ends of the catalyst tubes are suitably supported and partitioned off by means of tube sheets or the like so that a heating medium may be circulated about the vertically extending tubes. I prefer to employ hot oil injected at 569 and withdrawn at some higher point. Although the other mediums such as mercury vapor of diphenyl compounds may be employed, due regard being paid to the different characteristics of these other mediums.

While I have described in Fig. 10 a single catalyzer, as may be seen from Fig. 1, I prefer to employ two vertically extending catalyzers for increased efficiency, although it is to be understood that a single catalyzer is operative. This second catalyzer is of duplicate construction, hence needs little further description. This duplicate catalyzer would be connected in parallel with catalyzer 406 in the manner clearly shown and described under Fig. 1.

In Fig. 14 there is shown an improved oxidation tower 417 similar to the column portion 301 of Fig. 6 and substitutable therefor, hence the various associated parts such as catalyst pump etc. have not been shown in this figure. This tower is preferably cylindrical in shape and comprises a base 602 and the top or head 603. The interior is made up of a large number of bubble plates or pans having central openings covered by hoods or bells 307 as described with respect to Fig. 6. The edges of these hoods are sealed in the liquid carried by the plates or pans. The adjacent plates are connected by overflow pipes.

The important feature of this column is the cooling means. Positioned intermediate of the column is a cooling section of a special construction designated 423 and shown in detail in Figs. 15 and 16. This section includes the gas passages 610 and the overflow pipe 611.

The cooling means 613 comprises, as may be seen from Figs. 15 and 16, headers 614. Branching from these headers are a plurality of horizontal tubes 616 through which the cooling fluid may be circulated. Inlet and outlet pipes are provided at 617. Baffle plates 618 causes the catalyst solution to flow over the cooling tubes 616.

Positioned above this special cooling section 423 may be a plurality of cooling sections and regular sections arranged alternately or consecutively. These other cooling sections, designated 620 (see Fig. 14) and shown in detail in Figs. 8 and 9, comprise a cooling coil of circular zigzag construction or other suitable shape positioned above a plate containing a plurality of bubble caps, as already described with respect to Figs. 8 and 9.

The object of these cooling sections and their positioning is to provide an adequate graduated cooling throughout the tower and particularly in the reaction zone as contrasted with cooling external of the tower or localized cooling.

Positioned at a higher point in the column is another special cooling section designated 423' on Fig. 14 and shown in detail in Fig. 17. This section includes the gas passages 651 and 652 of unequal size and the larger cooling unit 653, having baffle plates 654. The plate 656 above the cooling unit is provided with an overflow 657 and tunnel cap, units 658, shown in detail in Figs. 18 and 19. The function of this special upper cooling section is to act somewhat as a dephlegmator.

The bubble cap or tunnel cap construction shown in Figs. 18 and 19 is of particular importance in that its rigid construction with a particular shaped gas opening permits the vigorous reaction to be carried out smoothly. It is comprised of a plurality of gas risers 671, covered by a rigidly affixed hood 672. On the lower edge of this hood, which in operation will be sealed in the liquid carried by the plates 674, are a large number of closely spaced tear drop or pear shaped openings. Such construction is of great assistance in causing a uniform and smooth flow of aldehyde, air and other gases through the catalyst solution contained in the tower.

Intermediate of the column and at a point below the special cooling section 309 (Fig. 6) are inlet pipes 623 and 624 for introducing an oxidizing fluid and aldehyde into the column. Branch pipes 626 are provided for introducing the oxidizing gas at a higher point in the column. All of these pipes are connected with a means which supplies the oxidizing medium, such as, for example, blower 418 of Fig. 10. In place of this blower the blower 327 and other parts of Fig. 6 may be employed.

The plurality of aldehyde inlet and air feed pipes construction is of great importance in that by means of the plurality of inlet pipes for the oxidizing gas and the aldehyde a smoother and more efficient reaction may be carried out.

Leading from the base of the oxidation column 417 is the conduit 622 through which the catalyst solution in the column may be withdrawn and circulated through to a catalyst heater in a manner the same as described under Fig. 6, being returned at 637.

While I have described the various apparatus of Figs. 11–19 used with respect to the flow diagram and plant layout of Fig. 10, as already indicated, the various pieces of equipment may be substituted or interchanged. For example, the multipass catalyzer structure of Fig. 13 may be employed in place of the single pass catalyzer 8 of Fig. 2.

When the multipass catalyzer is employed the use of any alcohol preheater is optional. If an alcohol preheater is to be employed then any of the preheater-vaporizer combinations of Fig. 2 or the structure of Fig. 12 may be employed.

From the preceding disclosure it will be apparent that my invention may be carried out in many forms of apparatus of which the apparatus described in the accompanying drawings is particularly suitable. While in Fig. 1 catalyzers in duplicate have been shown, it is understood that three or more catalyzers may be employed in either the plant layout of Figs. 1 or 10.

Also, a plurality of oxidation units may be employed.

Fig. 21 is another flow sheet representing how some of the disclosed modifications and refinements set forth herein may be adapted to my processes.

Referring now in detail to Fig. 21, the alcohol is pumped from storage 801 by pump 802 to feed 803 from which it goes to vaporizer 804, superheater 805, catalyst unit (or units 806) which are similar and charged and heated in a manner as already fully described with respect to Fig. 10.

The reaction products, from the catalyzer containing aldehyde, unreacted alcohol and hydrogen are passed through water cooled condenser 807, and ammonia cooled condenser 808, the condensate of alcohol and aldehyde being conducted to column 810, where the aldehyde is distilled off as already described with respect to column 410 of Fig. 10.

The uncondensed materials from ammonia condenser 808 comprising hydrogen with small amounts of aldehyde and/or alcohol, in accordance with the embodiments of this flow sheet, may be passed through an interposed scrubber column 831 of known construction wherein any materials such as aldehyde contained in the hydrogen are washed therefrom by means of a wash liquid, such as water. Water is satisfactory and readily obtainable and for these reasons preferred, however, the other liquids suggested herein may be employed. The hydrogen may be conducted through conduit 809 to a gas holder or otherwise disposed of.

The absorbing liquid from scrubber 831 containing aldehyde is heated in stripping column 832 to drive off the aldehyde which may be conducted through condenser 812 to either column 810 or 833, from which freshly distilled aldehyde may be obtained. The freshly distilled aldehyde from column 810 is conducted through condenser 812A and led to aldehyde storage 813. The freshly distilled aldehyde from column 833 may be condensed in condenser 812 and then led to column 810 from which it finally arrives at aldehyde storage 813. The various pipe lines on the flow sheet show suitable valves permitting this distillation and redistillation to produce a high grade freshly distilled aldehyde delivered to tank 813. As already indicated herein, the employment of distilled aldehyde is an important feature of my invention.

The unreacted alcohol solution recovered in the base 811 of column 810 is conducted to storage 830 from which it may be withdrawn for any desired use or for reuse in the system.

However, for improved results in reuse, it may be desirable to subject the alcohol to a refining treatment before returning it to the catalyzers. This may be accomplished by conducting the alcoholic solution to a base heater 816A of an alcohol fractionating column 816 where it may be subjected to a batch distillation as follows:

Any aldehyde and low boilers are fractionated and collected at 827. Then, sufficient caustic soda solution or other suitable alkali solution is added to base heater 816A to neutralize any small amount of acid present. The alcohol is then distilled off and collected in a relatively pure condition in tank 826 from which it may be conducted to alcohol feed 803 or vaporizer 804 for reuse, or employed for other purposes.

The residue remaining in base heater 816A contains, assuming caustic soda solution was employed as the neutralizing agent, sodium acetate, sodium propionate and water. This residue is drawn off and the corresponding acids recovered therefrom in accordance with well known procedure.

Freshly distilled aldehyde in tank 813 is conducted to vaporizers 814 where it is mixed with filtered air or other oxidizing medium and conducted into oxidizing columns 817.

The materials leaving the heads of oxidizing columns 817 are conducted through water cooled condenser 820 and ammonia cooled condenser, 822 to cause the separation of the acid fraction which is conducted to crude storage 824 from which it may be withdrawn for use or refining.

The materials uncondensed in condenser 822, comprising principally nitrogen (assuming air was employed as the oxidizing medium) containing unreacted aldehyde, according to a modification contemplated by me and shown in the flow sheet of Fig. 21, are scrubbed. This nitrogen fraction may be passed through a scrubber 834 wherein the contained aldehyde may be washed from the nitrogen containing exit materials by means of a suitable washing or absorbing means in a manner similar to that already described with respect to column 831.

The absorbing medium from scrubber 834 is conducted to flash column 833 in which the aldehyde may be flashed off, conducted through condenser 812 and from thence to column 810 where it is treated as already described.

The crude acid produced in storage tank 824 in accordance with the process just described or by other processes, such as for example, in accordance with flow sheets 1 and 10 or from some other source may be refined, if desired.

It will be also understood that the customary precautions for preventing heat losses by suitable insulation will be observed, that parts which contact with the acids or corrosive materials are made out of suitable materials such as aluminum, aluminum alloys, copper or copper alloys, iron silicon alloys and various types of stainless steel. The steel known as KA₂S, I have found is particularly suitable for the construction of all parts which contact corrosive material. This steel contains 16 to 23% chromium, about 7 to 11% nickel and the balance substantially iron and is characterized by the important feature of having a low carbon content of .07% or less. This steel may have a small amount, about .1–5% Cu, Mo, W or Si. When containing Mo, it may be designated KA₂SMo. Parts subject to heat will be constructed of heat-resisting materials. The dehydrogenation step is preferably operated under about atmospheric pressure and the oxidation step under a higher pressure. When I refer to boiling points and the like, I refer to this data as being obtained under normal conditions.

It is, therefore, apparent that while I have described my invention in some detail, there are many changes that may be made therein without departing from the spirit of the invention.

What I claim as my invention and desire to secure by Letters Patent of the United States is:

1. The process of dehydrogenating alcohol containing 3 to 4 carbon atoms which comprises preheating the alcohol at a temperature between about 530° F. and about 575° F., contacting the heated alcohol with a dehydrogenation catalyst which has low tendency to dust and essentially comprises water quenched pellets obtained from blown cuprous oxide maintained at a slightly higher temperature than the preheating temperature and cooling the reaction products.

2. In a process for the treating of a 3 to 4 carbon atom alcohol which includes the step of catalytically dehydrogenating the alcohol in the presence of a catalyst essentially comprising substantially dustless copper pellets obtained from blown cuprous oxide, the step which comprises activating the catalyst with alcohol of the character being employed in the dehydrogenation step.

3. The process which comprises preheating an alcohol containing 3 to 4 carbon atoms, passing the preheated alcohol in contact with a metallic dehydrogenation catalyst essentially comprising substantially dustless pellets obtained from blown cuprous oxide at a temperature between about 585° F.–671° F., and thereafter cooling the reaction products to below 32° F.

4. The process which comprises preheating normal propyl alcohol, passing preheated alcohol in contact with a catalyst essentially comprising substantially dustless pellets obtained from blown cuprous oxide at a temperature between about 585° F.–617° F., and thereafter cooling the reaction products to below 32° F.

5. In a process for the dehydrogenation of a 3 to 4 carbon atom alcohol by means of a catalyst essentially comprising substantially dustless pellets obtained from blown cuprous oxide, the method of reactivating the spent copper catalyst by subjecting spent catalyst to a treatment including the action of a flushing gas, the action of a gas containing free oxygen, and to the action of a reducing gas.

6. A process for preparing butyraldehyde which comprises contacting butyl alcohol with a catalyst essentially comprising substantially dustless water quenched pellets of copper initially obtained from cuprous oxide prepared by blowing molten copper with an oxidizing medium, and maintaining the temperature of the catalyst during contact at between about 400° F.–680° F.

7. The process of producing a 3–4 carbon atom aldehyde which comprises heating a 3–4 carbon atom normal alcohol to a temperature between about 400° F.–600° F. in the presence of copper, contacting the heated alcohol at a higher temperature with a catalyst essentially comprising substantially dustless water quenched pellets of copper initially obtained from cuprous oxide prepared by blowing molten copper with an oxidizing medium.

8. A process for producing propionaldehyde which comprises heating propyl alcohol to a temperature between about 500° F.–600° F. in the presence of a metal, contacting the heated alcohol at a temperature between about 500° F.–700° F. with a dehydrogenation catalyst, the catalyst essentially comprising substantially dustless water quenched pellets of copper initially obtained from cuprous oxide prepared by blowing molten copper with an oxidizing medium.

9. A process for producing butyraldehyde which comprises heating butyl alcohol to a temperature between about 500° F.–600° F. in the presence of a metal, contacting the heated alcohol at a temperature between about 500° F.–700° F. with a metallic dehydrogenation catalyst, the catalyst essentially comprising substantially dustless water quenched pellets of copper initially obtained from cuprous oxide prepared by blowing molten copper with an oxidizing medium.

10. The process of producing a 3–4 carbon atom aldehyde which comprises preheating a 3–4 carbon atom alcohol, contacting the heated alcohol with a catalyst essentially comprised of substantially dustless pellets obtained from blown cuprous oxide, whereby a reaction mixture of aldehyde, hydrogen and unreacted alcohol is obtained, and subjecting the alcohol and aldehyde to distillation, the alcohol distillation being carried out in the presence of alkali.

11. The process of producing propionaldehyde which comprises preheating propyl alcohol, contacting the heated alcohol with a catalyst essentially comprised of substantially dustless pellets obtained from blown cuprous oxide initially prepared by blowing molten copper with an oxidizing medium whereby a reaction mixture of propionaldehyde, hydrogen and unreacted propyl alcohol is obtained and subjecting the propyl alcohol and propionaldehyde to distillation, the alcohol distillation being carried out in the presence of alkali.

12. The process of producing butyraldehyde which comprises preheating butyl alcohol, contacting the heated alcohol with a catalyst essentially comprised of substantially dustless pellets obtained from blown cuprous oxide initially prepared by blowing molten copper with an oxidizing medium whereby a reaction mixture of butyraldehyde, hydrogen and unreacted butyl alcohol is obtained and subjecting the butyl alcohol and butyraldehyde to distillation, the alcohol distillation being carried out in the presence of alkali.

13. In a process for the dehydrogenation of alcohol by means of a catalyst, the steps of activating the spent catalyst by subjecting the spent catalyst at a temperature of from 500° F. to 680° F. to the action of a flushing gas, then to the action of an oxygen-containing gas, then to the action of a reducing gas.

14. In a process for the conversion of 3–4 carbon atom alcohols to aldehydes by means of a catalyst containing a predominating amount of copper initially obtained by blowing molten copper with an oxidizing medium, the method of reactivating the spent copper catalyst which comprises subjecting a spent catalyst to a flushing treatment, then to an oxidizing treatment, then to cooling, and to a reducing treatment with a 3–4 carbon atom alcohol.

15. In a process for the conversion of 3–4 carbon atom alcohols to aldehydes by means of a catalyst containing a predominating amount of copper initially obtained by blowing molten copper with an oxidizing medium, the method of reactivating the spent copper catalyst which comprises subjecting a spent catalyst to a flushing treatment, then to an oxidizing treatment carried out between about 600° F.–800° F., then to cooling, and to a reducing treatment at about 300° F.–400° F. with a 3–4 carbon atom alcohol.

16. A process for preparing 3–4 carbon atom aldehydes which comprises contacting a 3–4 carbon atom alcohol with a substantially dustless catalyst essentially comprising copper initially obtained from cuprous oxide prepared by blowing molten copper with an oxidizing medium followed by quenching of the molten mass and sizing thereof to small pellets and maintaining the temperature of the catalyst during contact at between about 400° F.–680° F.

17. A process for preparing propionaldehyde which comprises contacting propyl alcohol with a substantially dustless catalyst containing a predominating amount of copper initially obtained from cuprous oxide prepared by blowing molten copper with an oxidizing medium followed by water quenching and sizing of the molten mass to small pellets of 2–5 mesh, and maintaining the temperature of the catalyst during contact at between about 400° F.–680° F.

RUDOLPH LEONARD HASCHE.

CERTIFICATE OF CORRECTION.

Patent No. 2,173,111.  September 19, 1939.

RUDOLPH LEONARD HASCHE.

It is hereby certified that error appears in the printed specification of the above numbered patent requiring correction as follows: Page 11, first column, lines 69 and 70, claim 3, strike out the words "temperature between about 585° F.-671° F., and" and insert instead --sufficient temperature to cause dehydrogenation, but below 680° F.,--; and that the said Letters Patent should be read with this correction therein that the same may conform to the record of the case in the Patent Office.

Signed and sealed this 3rd day of September, A. D. 1940.

(Seal)

Henry Van Arsdale,
Acting Commissioner of Patents.